United States Patent [19]

Rasmussen

[11] Patent Number: 5,018,774
[45] Date of Patent: May 28, 1991

[54] STRAP CONNECTOR

[76] Inventor: Donald D. Rasmussen, P.O. Box 250, Tualatin, Oreg. 97062

[21] Appl. No.: 448,310

[22] Filed: Dec. 11, 1989

[51] Int. Cl.⁵ .............................. F16G 11/00
[52] U.S. Cl. .................... 294/74; 24/129 R
[58] Field of Search ............ 294/74, 82.11, 82.14; 24/129 R, 129 A, 198, 200, 68 E, 68 F, 68 CD, 169

[56] References Cited

U.S. PATENT DOCUMENTS

| 352,039 | 11/1886 | Carroll | 24/200 X |
| 2,602,206 | 7/1952 | Rishel | 24/129 R |
| 4,584,741 | 4/1986 | Kawahara | 24/68 CD |
| 4,799,296 | 1/1989 | Rasmussen | 24/68 CD X |

FOREIGN PATENT DOCUMENTS

| 3722070 | 11/1988 | Fed. Rep. of Germany | 294/74 |
| 3717711 | 12/1988 | Fed. Rep. of Germany | 294/74 |

Primary Examiner—Margaret A. Focarino
Assistant Examiner—Dean J. Kramer
Attorney, Agent, or Firm—Eugene M. Eckelman

[57] ABSTRACT

A body portion is attachable to powered lifting mechanism and has an anchor projection arranged to be engaged by an end loop of a strap formed by a doubled back portion of the strap. Abutments are provided on the body portion that are offset from the anchor projection to provide a reeved engagement by the doubled back strap such that a load end of the strap is arranged to pinch a free end against an abutment by a lifting force on the load to secure the strap non-slidably in the connector. The anchor projection and abutments are disposed at the front surface of the body portion for simple edge loading movement of the strap. The connector can be used to form a simple loop type of support or it can form a choker type of loop.

4 Claims, 1 Drawing Sheet 5,018,774

1

STRAP CONNECTOR

BACKGROUND OF THE INVENTION

This invention relates to new and useful improvements in strap connectors.

In my U.S. Pat. No. 4,799,296, a strap connector is illustrated wherein a loop end of the strap is anchored on a removable anchor pin and a doubled back portion of the strap extends over a cross bar such that the load end of the strap pinches the free end thereof, providing convenient releasable securement of the strap in the connector.

The releasable securement of the free end of the strap in a connector such as shown in my U.S. Pat. No. 4,799,296 has several advantages. One such advantage is that by the use of a strap with a free end, components can be placed close together or raised only slightly from a support surface in order to remove the strap since the free end of the latter can be pulled out of a very limited space. Another advantage of utilizing a strap with a free end in a connector is that one strap length can accommodate many different length usages because the free end is readily adjusted for securement in the connector.

SUMMARY OF THE INVENTION

A primary objective of the invention is to provide an improved structure in a strap connector of the type that connects to a strap with a free end. More particularly, it is an object to provide a connector of the type described that is side loaded for fast and convenient connection.

Another object is to provide a strap connector that is versatile in its use either in the formation of a fixed load handling loop or a choker type loop.

In carrying out the objectives of the invention, the strap connector comprises a body portion having side recess means arranged for side loading of a lifting strap with a free end. The recess means is structured to provide a reeved engagement of a doubled back lifting strap portion and a loop engagement at one end of the strap formed by the doubled back portion whereby a load end of the strap in the operation of the connector pinches the free end against a curved portion of the recess means by a lifting force on the load end to secure the strap non-slidably in the connector. The recess means in particular comprise a first portion leading upwardly from the lower end to a point short of the upper end, a second portion also leading upwardly from the lower end and cooperating with the first slot to form an upper abutment point around which the doubled back strap is turned, and a third portion leading upwardly from the lower end and cooperating with the second recess to form a lower abutment point around which the doubled back strap is also turned. The end loop is hooked on an anchor projection.

The invention will be better understood and additional objects and advantages will become apparent from the following description taken in connection with the accompanying drawings.

DETAILED DESCRIPTION OF A PREFERRED EMBODIMENT

Figure 1:
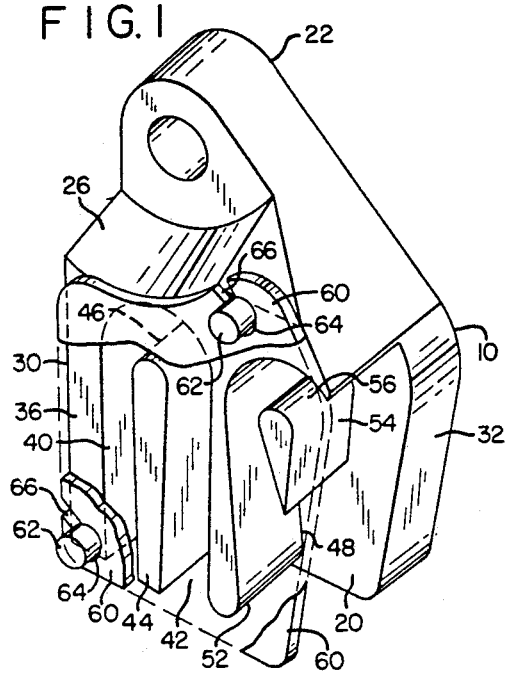
FIG. 1 is a perspective view of a strap connector that includes features of the present strap connector.
Figure 2:
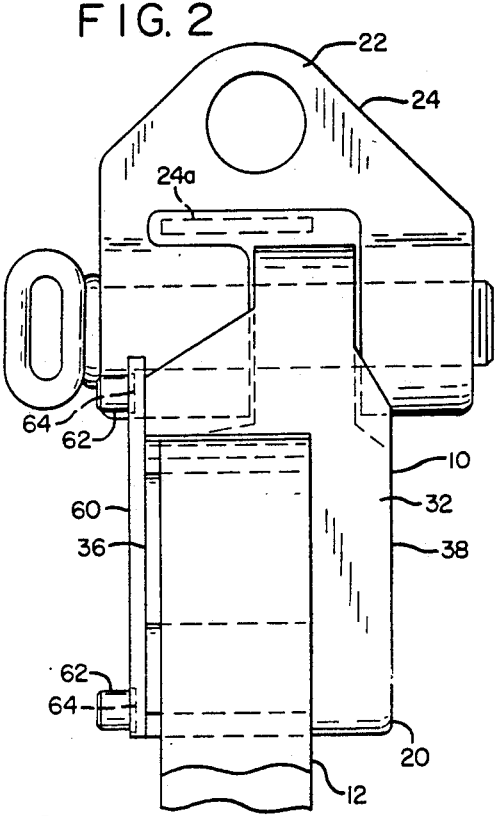
FIG. 2 is a side elevational view, taken from the right side of FIG. 1 and showing a shackle attached to the connector.
Figure 3:
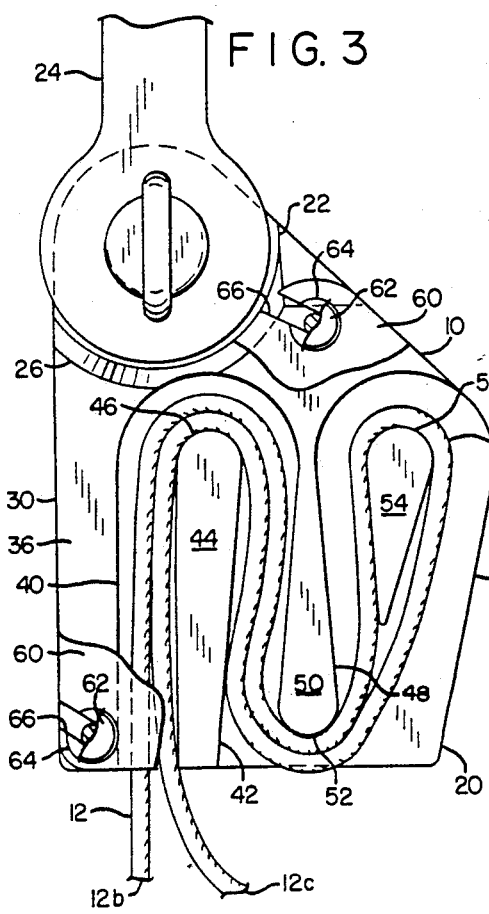
FIG. 3 is a face view of the recessed portion showing reeved engagement of a lifting strap, this view illustrating a first manner of use of the connector.

The present strap connector, designated by the numeral 10, can be used in association with any type of lifting means that is capable of employing conventional strapping 12. For example, it may be used with a crane lifting assembly, not shown, and as will become more apparent herein it may be used for any lifting purpose where it is desired that a strap be releasably connected to a load. Also, as will be more apparent herein, the connector can function in a fixed looptype connection or a choker type connection.

The connector comprises a rugged body portion 20 having a lifting eye 22 at the upper end thereof for connection to a shackle 24 or the like. The body portion is recessed at 26 below the eye 22 to provide pivotal working clearance for the shackle and has side edges 30 and 32 and front and rear surfaces 36 and 38, respectively.

The lifting eye 22 is offset laterally on the body portion so as to be closer to side edge 30 which is the lifting load side than to side edge 32 for balanced suspension on a lifting strap. The side edges 30 and 32 as well as rear wall surface 38 are flat and smoothly finished, which as will be seen presents a non-damaging sliding surface relative to articles being lifted, or to the strap itself.

Front surface 36 is provided with novel recess portions arranged for reeving a strap 12 edgewise therein in a releasable securement. Such recesses comprise a first portion 40 which leads up from the bottom edge substantially parallel with side edge 30 and spaced therefrom toward the other side edge. A second recess 42 also leads up from the bottom edge but its walls angle back to top bottom approximately 5 to 10 degrees toward the first recess. The strip 44 of the body portion formed between recesses 40 and 42 has a rounded upper end 46 arranged to support a strap extending over it without damage to the latter.

A third recess 48 also extends up from the bottom edge and is spaced from recess 42. The strip 50 of the body portion between recesses 42 and 48 has a rounded lower end 52 arranged to been engaged by strap portions wrapped thereunder. The recess 48 opens laterally through outer side edge 32 and has a projection 54 in an upper portion which has an upper rounded end 56 arranged to support strap portions extending over it. Projection 54 extends only part way down to the bottom edge of the body portion and feathers to a point at its bottom edge whereby to maintain the strap adjacent edge 32 within the confines of the recess.

The body portion 20 of the connector is of sufficient width between front and rear surfaces 36 and 38, respectively, such that the depth of the recess portions 40, 42 and 48 is sufficient to fully receive the strap 12 edgewise and at the same time to leave sufficient body thickness for overall strength. Also, the recess portions 40 and 42 are sufficiently wide to freely receive a double thickness of strap.

For loading a strap in the connector, the strap is first doubled back upon itself at the point of determined length of the strap. The strap can be marked with dimensional figures for determining its point of connection, or the points of several straps can be marked when two or more are used in the same lift. This doubled back procedure forms an end loop 12a which is hooked over the top rounded end 56 of projection 54. The doubled strap is then wrapped or reeved under rounded end 52 of strap 50 and then threaded up through recess 42 over the rounded end 46 of strip 44 and down recess 40. The load end 12b of the strap is then connected to the load for lifting, the free end 12c of the strap merely dangling free. When the weight of the load bears on the load end 12b of the strap, such load end pinches the free end at the upper abutment end 46 of the projection 44 to positively secure the free end of the strap against slippage in the body portion of the connector. An integral connection is thus provided between the lifting means and the strap.

As explained, the recess 40 is substantially parallel with the side edge 30 but the recess 42 angles back toward the recess 40 whereby to provide more of a wrap around the top of the strip 44 and obtain a good friction grip on the strap end 12c.

The strap ends can be reversed, namely, the load end 12b can be on the inner side of the free end. In such a case, the strap is similarly doubled back upon itself to form an end loop 12a to be hooked over the projection 54 and the doubled back strap threaded in a similar manner. The friction pinching point, however, in this latter threaded arrangement will be at point 52, namely, at the bottom of strip 50. A good securement by either method is obtained and thus no misloading of the strap in the connector can occur.

In a preferred structure, a removable cover plate 60 is mounted on the front surface 36 to insure confinement of the strap in the connector. The removable connection of this plate is by a pair of diagonally located cap screws 62 threadedly mounted in the body portion 20. These screws have their heads engageable in shallow recesses 64 in the cover plate and their threaded shanks passing through slots 66 leading in an arc with a radius that is directed toward the other screw. Thus, the plate can be opened for loading or unloading a strap relative to the connector by loosening one screw sufficiently to clear its head from its recess 64, loosening the other screw a small amount in its recess, and then pivoting the plate to an open position. The plate can be temporarily locked in this open position by retightening the latter screw. The screw attachments 62 are selectively located with relation to the shape of the parts so that the strap loading recesses in the front of the body portion are fully exposed when the plate is swung open with one screw as the pivot.

Figure 4:
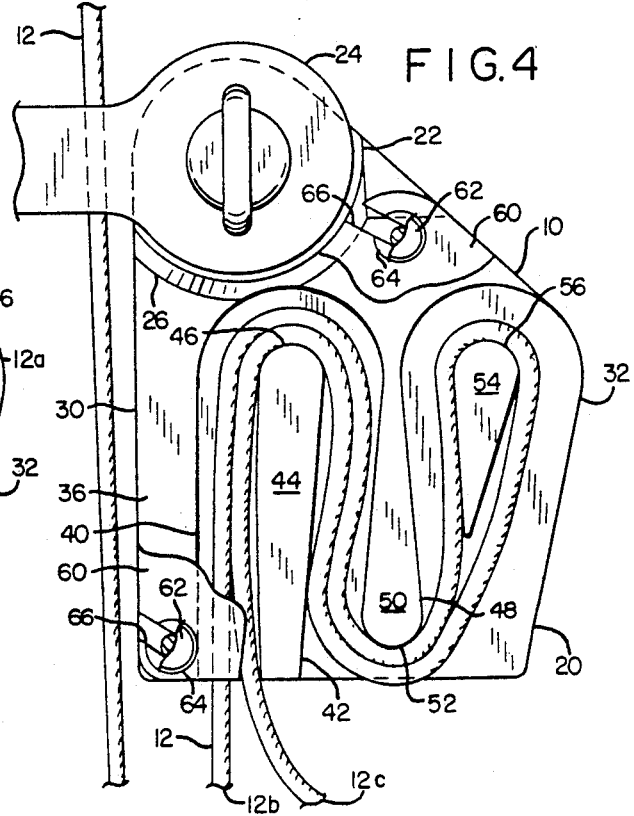
FIG. 4 is a face view of the recessed portion but showing a second manner of use of the connector.

As seen in FIG. 4, the device can also be used as a choker. The shackle is of a type having a lateral slot 24a for slidably receiving the strap. Otherwise, the connector is used the same way for connection except that the load end of the strap will pass down through the shackle and lie along the side edge 30 of the connector. After passing around the load for the choker connection, the free end is secured in the connector as hereinbefore described in connection with FIG. 1.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A strap connector comprising:
   a body portion having upper and lower ends and also having front and rear surfaces and side edges,
   attaching means on the upper end of said body portion for attachment to power lifting means,
   a plurality of recess means in said front surface leading upwardly from said bottom end to a point short of the upper end and having a depth sufficient to fully receive a strap edgewise therein from said front surface,
   a first and second of said recess means having a width between defining walls thereof to receive load and free portions of the strap in doubled relation,
   the first and second of said recess means communicating with each other adjacent the upper end of said body portion to form a first abutment for a doubled portion of a strap reeved therefore,
   the second and a third of said recess means communicating at the lower end of said body portion to form a second abutment for load and free portions of the strap reeved thereunder,
   and an anchor projection in said third recess means arranged to be engaged by a doubled back end loop in the strap,
   the load end of the strap being arranged to pinch the free end of the strap against one of said abutment means by a lifting force on the load end whereby to secure the strap nonslidably in the connector.

2. A strap connector comprising;
   a body portion having upper and lower ends and also having front and rear surfaces and side edges,
   attaching means on the upper end of said body portion for attachment to power lifting means,
   a plurality of recess means in said front surface leading upwardly from said bottom end to a point short of the upper end and having a depth sufficient to fully receive a strap edgewise therein from said front surface,
   a first and second of said recess means having a width between defining walls thereof to receive load and free portions of the strap in doubled relation,
   the first and second of said recess means communicating with each other at the upper end thereof to form a first abutment for a doubled portion of a strap reeved thereover,
   the second and a third of said recess means communicating at the lower end thereof to form a second abutment for load and free portions of the strap reeved thereunder,
   and an anchor projection in said third recess means arranged to be engaged by a doubled back end loop in the strap,
   the load end of the strap being arranged to pinch the free end of the strap against one of said abutment means by a lifting force on the load end whereby to secure the strap nonslidably in the connector,
   the first of said recess means being offset laterally from the center of said body portion and said attaching means being similarly offset whereby a force from lifting means connected to said attaching means will be approximately directly over the first of said recess means.

3. The strap connector of claim 2 wherein the side edge of said body portion adjacent the first of said recess means has a straight surface between the upper and lower ends providing a non-damaging slidably surface for a choker strap.

4. A strap connector comprising:

a body portion having upper and lower ends and also having front and rear surfaces and side edges, attaching means on the upper end of said body portion for attachment to power lifting means, a plurality of recess means in said front surface leading upwardly from said bottom end to a point short of the upper end and having a depth sufficient to fully receive a strap edgewise therein from said front surface, a first and second of said recess means having a width between defining walls thereof to receive load and free portions of the strap in doubled relation, the first and second of said recess means communicating with each other at the upper end thereof to form a first abutment for a doubled portion of a strap reeved thereover, the second and a third of said recess means communicating at the lower end thereof to form a second abutment for load and free portions of the strap reeved thereunder, an anchor projection in said third recess means arranged to be engaged by a doubled back end loop in the strap, the load end of the strap being arranged to pinch the free end of the strap against one of said abutment means by a lifting force on the load end whereby to secure the strap non-slidably in the connector, and a cover plate for the front surface of said body portion for holding a strap in said recess means, said plate being pivotally connected to said body portion at a corner portion thereof and having a latch connection to the body portion at a diagonal corner thereof whereby said plate is arranged in its latched position to conceal the recess means and a strap mounted edgewise therein and to expose said recess means for connecting or disconnecting the strap after first swinging the plate open on said pivot.

* * * * *